(12) United States Patent
Takahashi

(10) Patent No.: US 9,019,619 B2
(45) Date of Patent: Apr. 28, 2015

(54) ZOOM LENS AND IMAGE PROJECTION APPARATUS INCLUDING ZOOM LENS

(71) Applicant: Canon Kabushiki Kaisha, Tokyo (JP)

(72) Inventor: Makoto Takahashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/083,281

(22) Filed: Nov. 18, 2013

(65) Prior Publication Data

US 2014/0139930 A1 May 22, 2014

(30) Foreign Application Priority Data

Nov. 21, 2012 (JP) ................................. 2012-255274

(51) Int. Cl.
*G02B 15/177* (2006.01)

(52) U.S. Cl.
CPC .................................... *G02B 15/177* (2013.01)

(58) Field of Classification Search
CPC ...... G02B 15/14; G02B 15/15; G02B 15/155; G02B 15/16; G02B 15/161; G02B 15/177; G02B 15/20; G02B 15/22; G02B 15/00
USPC ............................ 353/100, 101; 359/680–685
See application file for complete search history.

(56) References Cited

U.S. PATENT DOCUMENTS

| 7,605,985 | B2 | 10/2009 | Nagahara et al. | |
|---|---|---|---|---|
| 8,390,935 | B2 | 3/2013 | Nagahara | |
| 8,699,152 | B2* | 4/2014 | Amano | 359/761 |
| 2001/0050818 | A1* | 12/2001 | Wada et al. | 359/649 |
| 2009/0135497 | A1* | 5/2009 | Nagahara et al. | 359/682 |
| 2010/0271601 | A1* | 10/2010 | Amano | 353/97 |
| 2011/0013151 | A1* | 1/2011 | Nagahara | 353/101 |

* cited by examiner

*Primary Examiner* — Suchin Parihar
*Assistant Examiner* — William R Alexander
(74) *Attorney, Agent, or Firm* — Canon USA Inc. IP Division

(57) ABSTRACT

A zoom lens includes a front group, an aperture stop, and a rear group. The front group includes a lens unit configured not to move during zooming and a front variable power lens unit including one or more lens units and configured not to move during zooming. The rear group includes, in order from a magnification conjugate side to a reduction conjugate side, a rear variable power lens unit having one or more lens units and configured to move during zooming, and a lens unit configured not to move during zooming. The aperture stop moves during zooming, and the front group has an auxiliary stop which moves during zooming. A length from a focal point position of the front group to the aperture stop, and imaging magnifications of the rear group, at a wide angle end and a telephoto end, are set to adequate values.

6 Claims, 10 Drawing Sheets

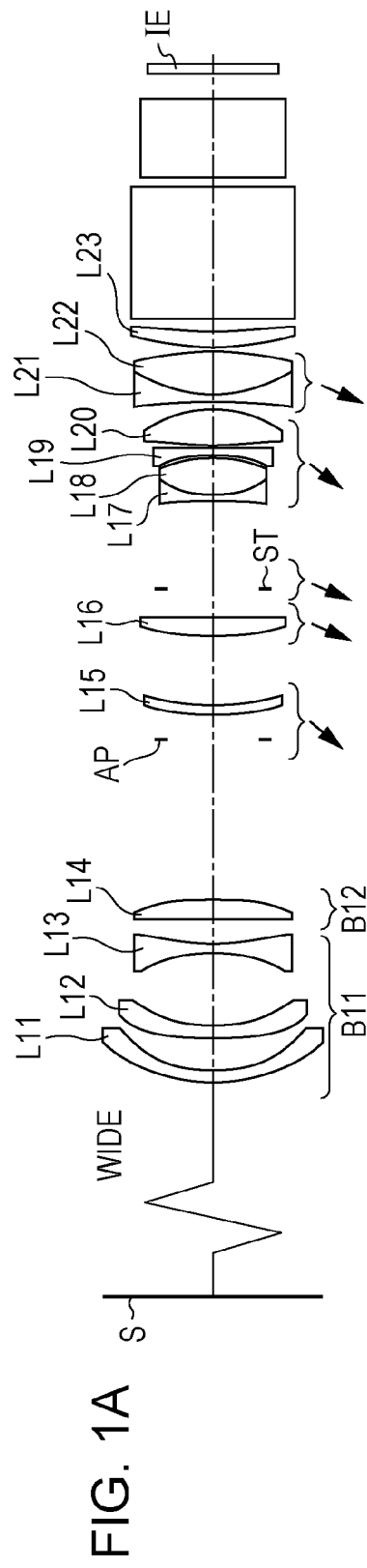
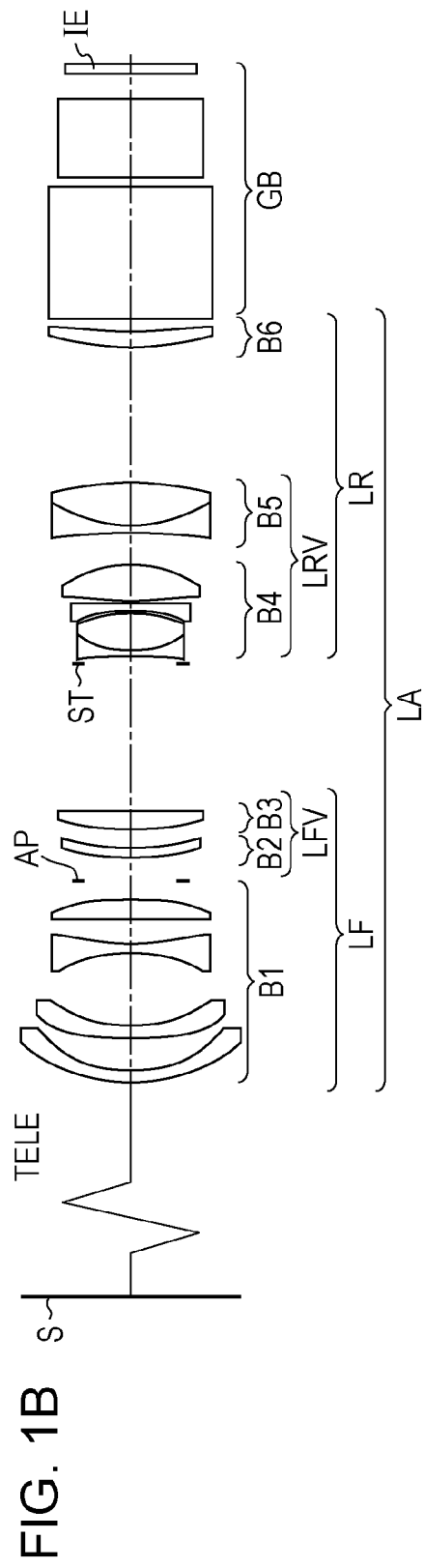
FIG. 1A
FIG. 1B

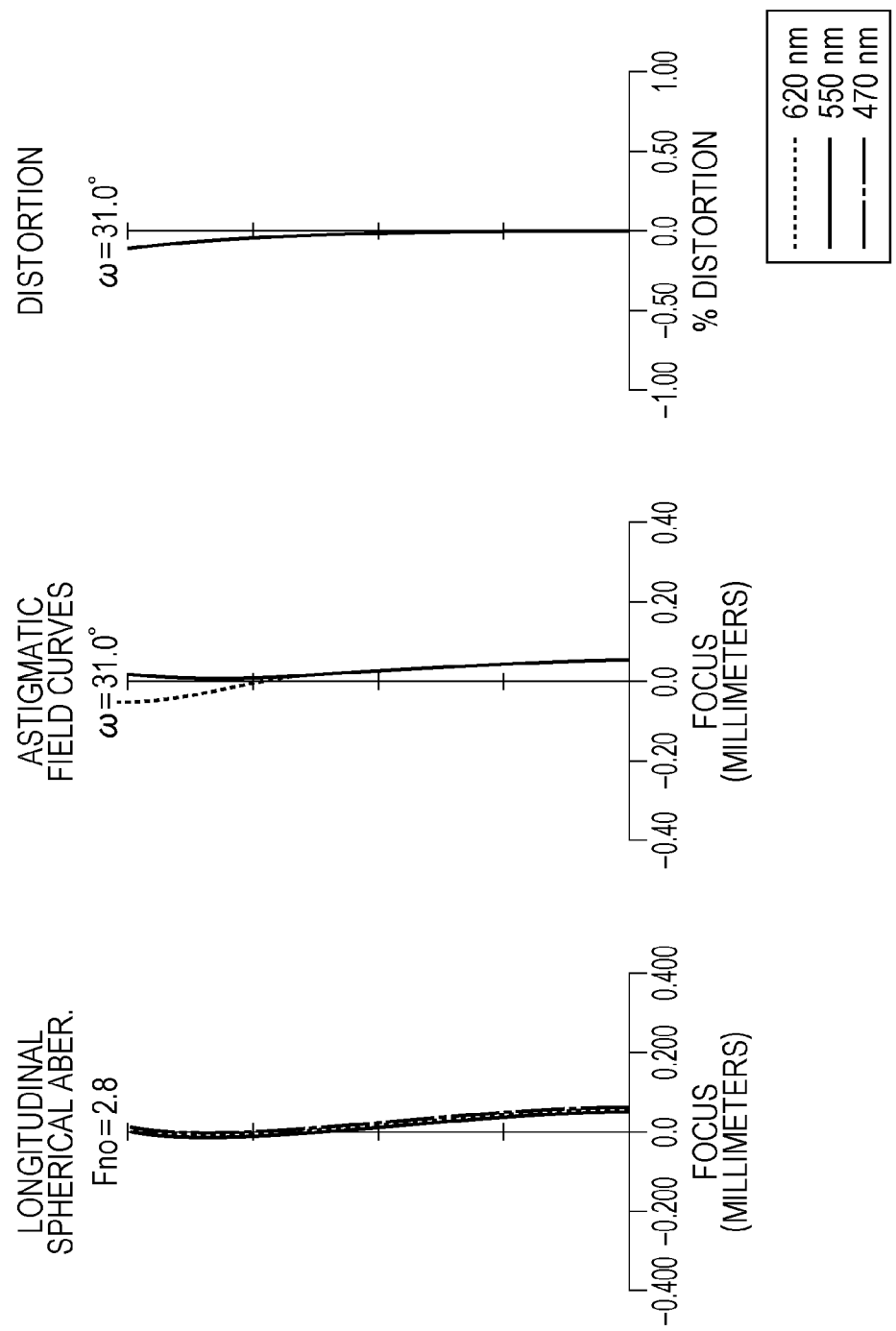

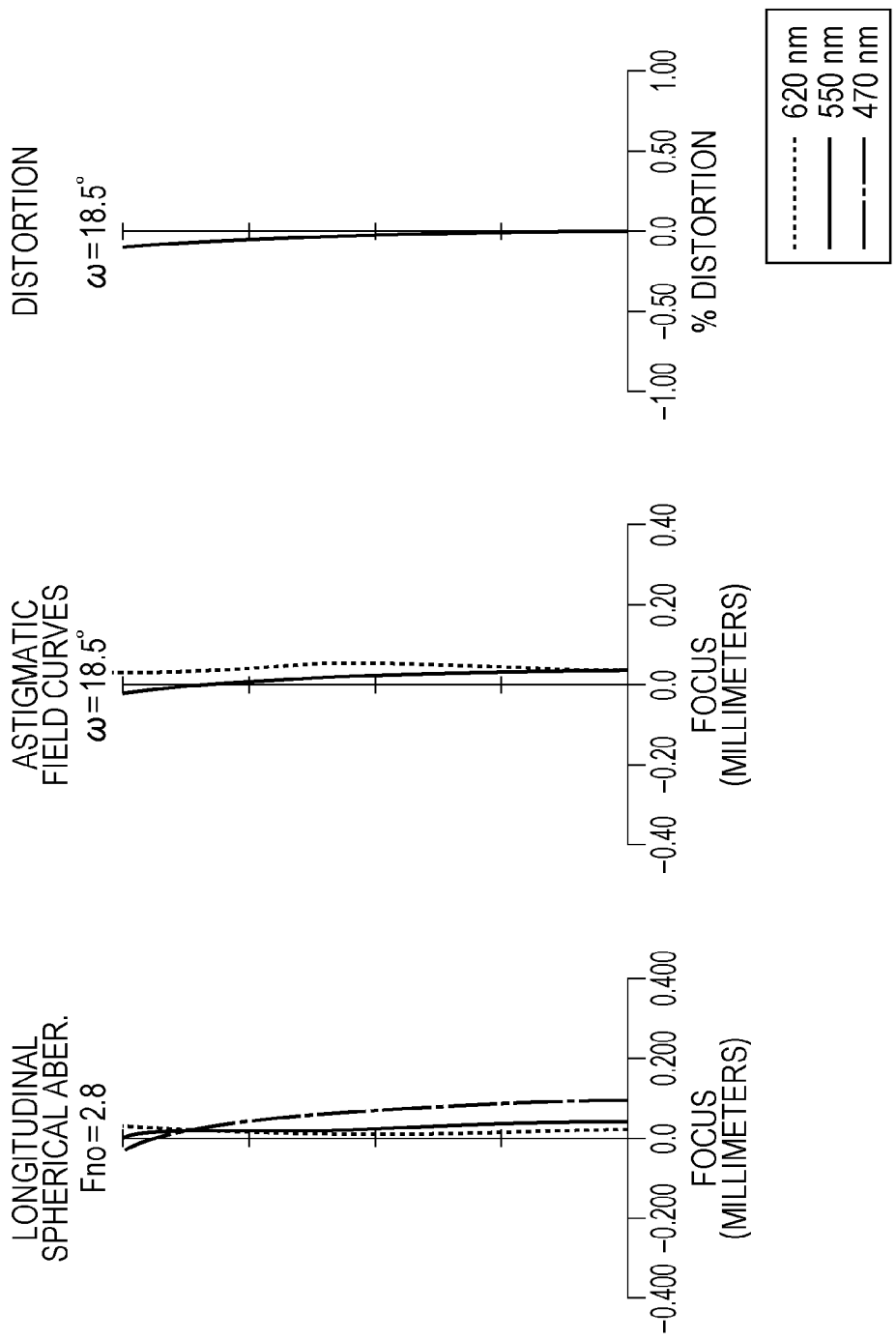

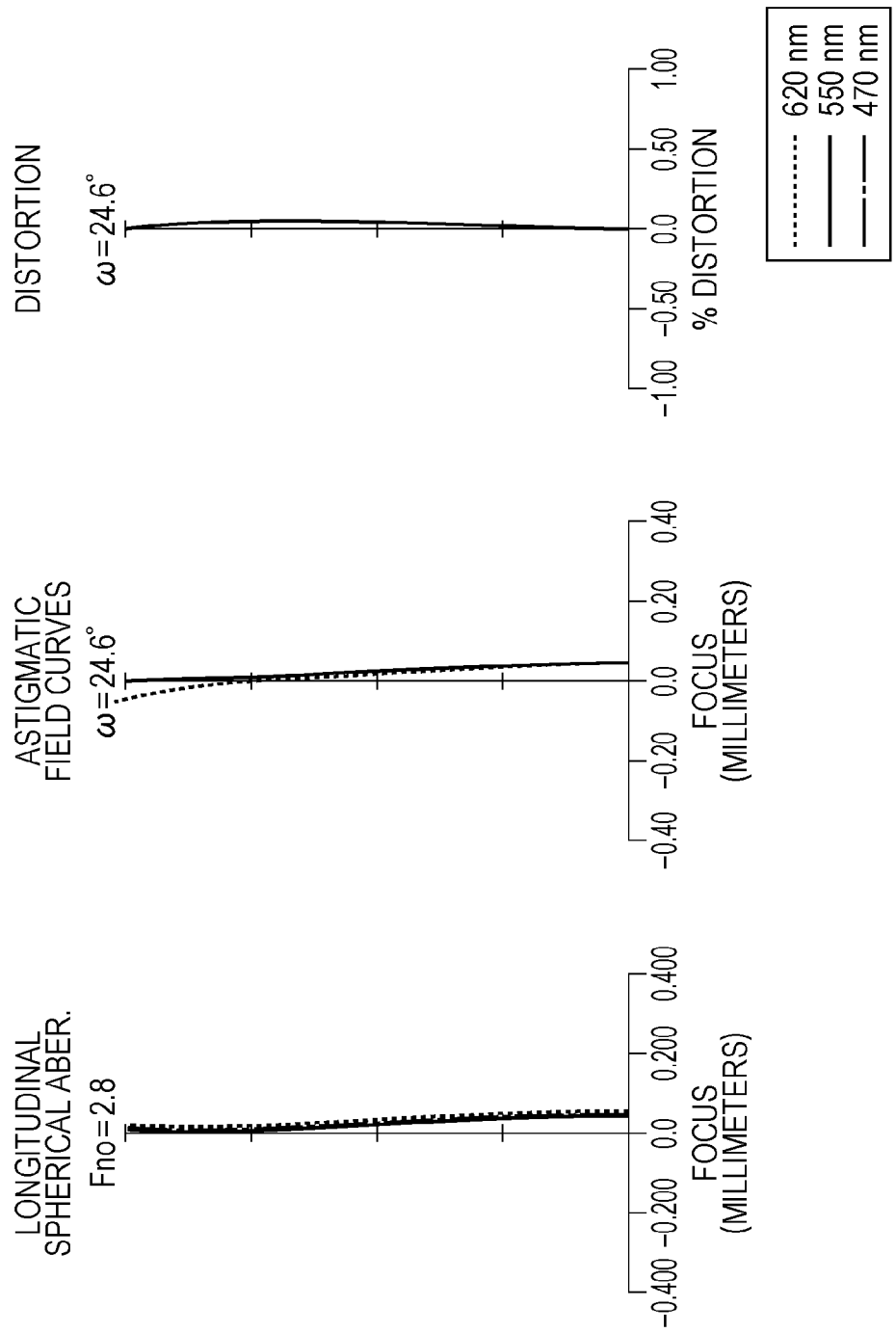

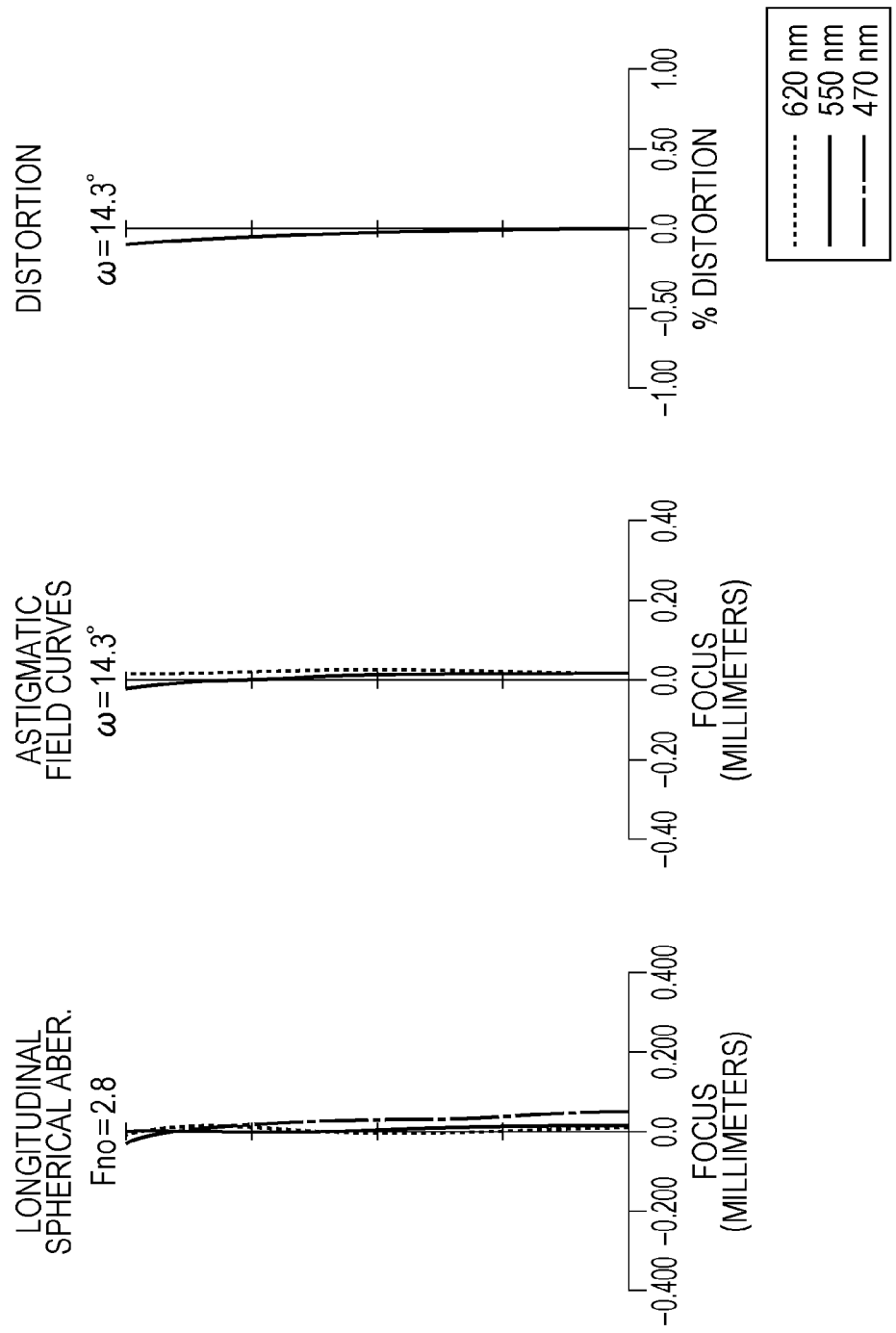

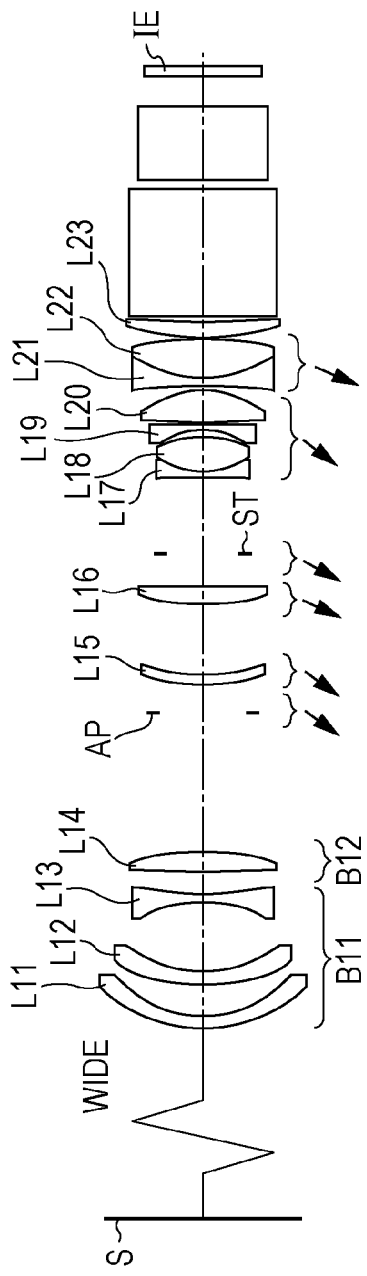
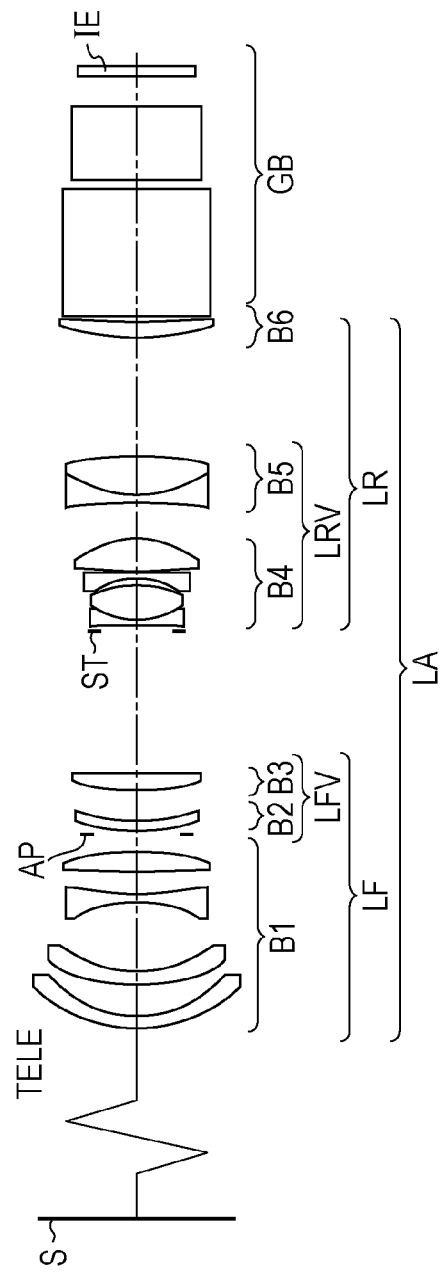
FIG. 5A
FIG. 5B

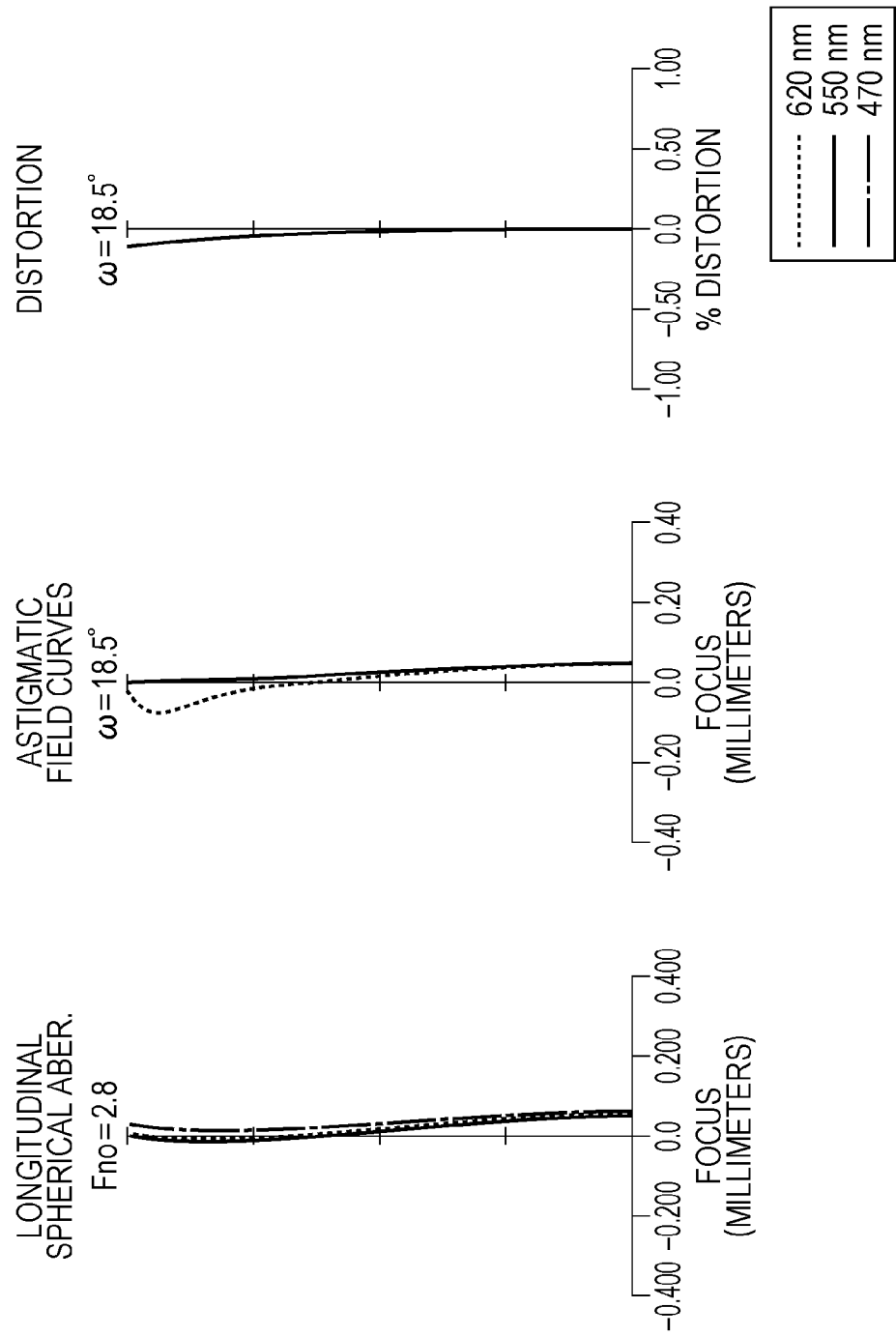

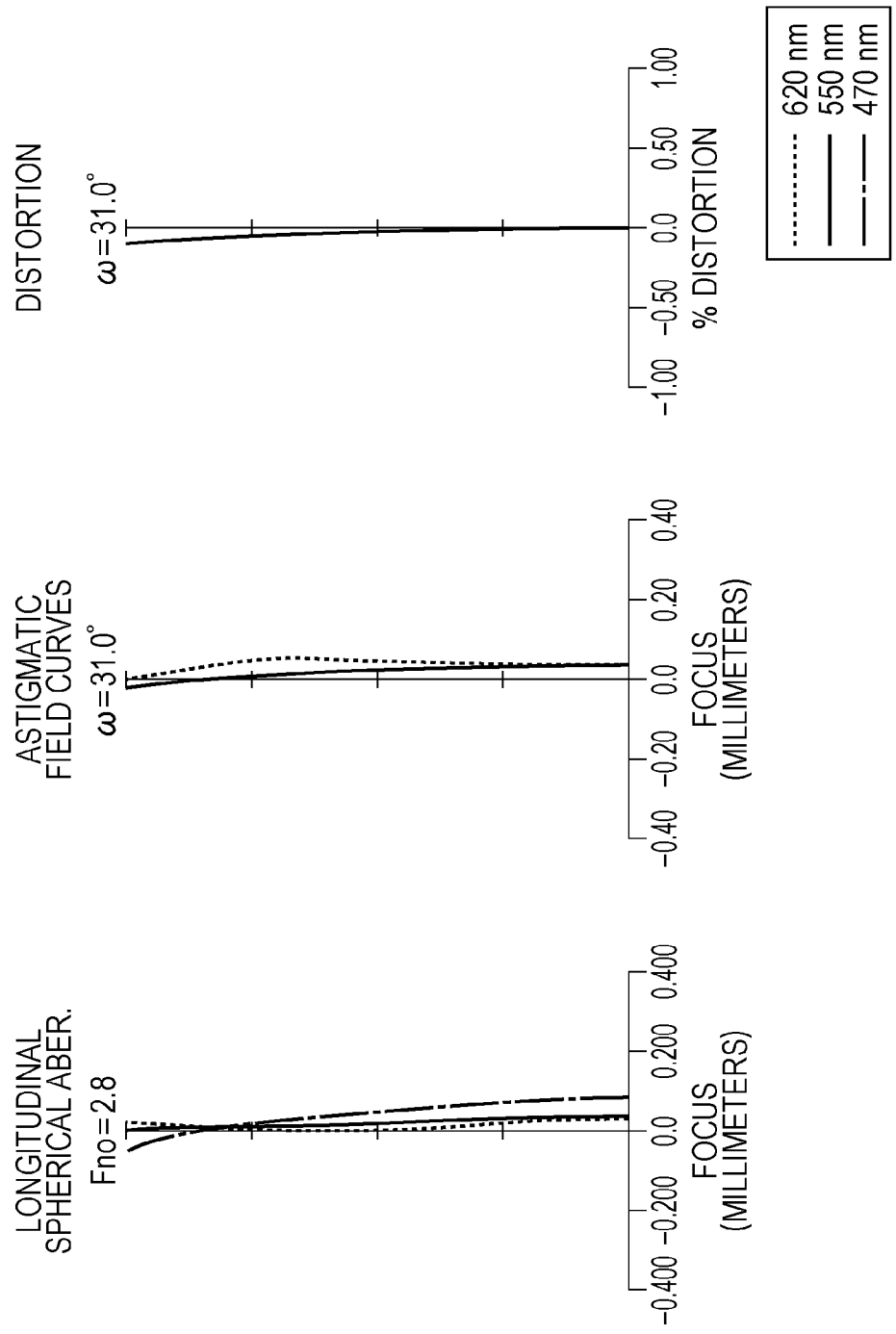

ZOOM LENS AND IMAGE PROJECTION APPARATUS INCLUDING ZOOM LENS

BACKGROUND

1. Field

The present disclosure relates to a zoom lens which is suitable for use in an image projecting apparatus (projector) configured to project, for example, an image in an enlarged scale.

2. Description of Related Art

In the related art, various image projecting apparatuses (projectors) exist. Known projection apparatuses are generally configured to use an image display device such as liquid crystal display and project an image on the basis of the image display device on a screen surface in an enlarged scale by a projection optical system. To that end, the projector is desired to project a bright projection image in order to ensure appropriate visibility when the image is projected in an enlarged scale. The projection optical system used in the projector is desirably a zoom lens capable of projecting the image in various projection magnifications. Depending on the environment where the projector is installed, the projection optical system requires certain specific installation properties. However, the zoom lens for the projector has a problem in that the brightness of the projected image changes at the time of zooming when an F number (aperture number) changes, which is not desirable in terms of viewability. Therefore, various attempts have been made to obtain a projection zoom lens free of such shortcomings.

U.S. Pat. No. 7,605,985 and U.S. Pat. No. 8,390,935 disclose the zoom lenses configured to maintain the brightness of a projected image by maintaining the F number over the entire zoom range of the zoom lens for projectors.

A projection zoom lens disclosed in U.S. Pat. No. 7,605,985 includes first to sixth lens units having refractive powers of negative, positive, positive, positive, positive, and positive arranged in this order from the enlarging side, and an aperture having a fixed or variable aperture diameter and moving independently at the time of zooming provided between the fourth lens unit and the fifth lens unit. In this configuration, it is believed that the F number is kept constant over the entire zoom range.

A projection zoom lens disclosed in U.S. Pat. No. 8,390,935 includes first to sixth lens units having refractive powers of negative, positive, positive, negative, positive, and positive arranged in this order from the enlarging side, and an aperture having a mask moving integrally with the second lens unit at the time of zooming on the image side of the second lens unit. The projection zoom lens disclosed in U.S. Pat. No. 8,390,935 also includes an auxiliary stop having a fixed aperture at the time of zooming on the side of the object of the sixth lens unit. In this configuration, the F number is kept constant over the entire zoom range.

The zoom lens used in the projector is required to provide high-quality projected images, and be capable of projecting at a constant brightness with various enlargement magnifications with a smaller change in F number at the time of zooming when projecting the images. In order to provide high-quality projected images, and keep the brightness of the projected image constant at the time of zooming, that is, in order to keep the F number constant over the entire zoom range, adequate setting of a lens configuration such as zoom types or positions of the aperture stop is important.

In the projection zoom lens disclosed in U.S. Pat. No. 7,605,985, a configuration in which a change in F number is small at the time of changing the power by moving the aperture stop at the time of zooming. However, there is a problem that excessive light at the wide angle end cannot be cut and hence high quality image projection cannot be realized along the entire zoom range. In the projection zoom lens disclosed in U.S. Pat. No. 8,390,935, unnecessary light is cut by providing the auxiliary stop. However, since the aperture stop is fixed on a reduction conjugate side, there is a tendency for various aberrations to significantly vary from one zoom position to another, and a change in optical performance caused by zooming is increased.

SUMMARY OF THE INVENTION

In accordance with a least one embodiment disclosed herein, a zoom lens includes: a front group having a plurality of lens units; an aperture stop; and a rear group having a plurality of lens units in this order from a magnification conjugate side to a reduction conjugate side, wherein the front group includes a lens unit having a negative refractive power and configured not to move at the time of zooming, and a front variable power lens unit including one or more lens units moving at the time of zooming in the order from the magnification conjugate side to the reduction conjugate side from a magnification conjugate side to a reduction conjugate side, the rear group includes a rear variable power lens unit having one or more lens units moving at the time of zooming and a lens unit having a positive refractive power and configured not to move at the time of zooming in this order from the magnification conjugate side to the reduction conjugate side, the aperture stop moves at the time of zooming, the front group includes an auxiliary stop having a constant aperture diameter moving at the time of zooming, a conditional expression, $$0.9 < (Xt \cdot \beta tb)/(Xw \cdot \beta wb) < 1.1$$

is satisfied, here Xw and Xt are the length from a focal point position of the front group to the aperture stop at the wide angle end and the telephoto end and βwb and βtb are the imaging magnifications of the rear group at the wide angle end and the telephoto end.

Further features of the present invention will become apparent from the following description of exemplary embodiments with reference to the attached drawings.

BRIEF DESCRIPTION OF THE DRAWINGS

FIGS. 1A and 1B illustrate cross-sectional views of a lens at a wide angle end and a telephoto end, respectively, in accordance with Example 1 described herein.

FIGS. 2A and 2B are aberration charts at a projection distance of 2100 mm at the wide angle end and the telephoto end, respectively, of the lens illustrated in Example 1.

FIGS. 4A and 4B are aberration charts at a projection distance of 2100 mm at the wide angle end and the telephoto end, respectively, of the lens illustrated in Example 2.

FIGS. 5A and 5B illustrate cross-sectional views of a lens at a wide angle end and a telephoto end, respectively, in accordance with Example 3.

FIGS. 6A and 6B are aberration charts at a projection distance of 2100 mm at the wide angle end and the telephoto end, respectively, of the lens illustrated in Example 3.

DESCRIPTION OF THE EMBODIMENTS

This disclosure provides a zoom lens having a small change in F number over an entire zoom range, less fluctuation in various aberrations at the time of zooming, and capable of obtaining high optical performance over the entire zoom range.

Examples of the zoom lens according to this disclosure will be described below. The zoom lens includes a front group having a plurality of lens units, an aperture stop, and a rear group having a plurality of lens units in this order from a magnification conjugate side to a reduction conjugate side. The front group includes a lens unit having a negative refractive power and configured not to move at the time of zooming, and a front variable power lens unit including one or more lens units moving at the time of zooming from the magnification conjugate side to the reduction conjugate side.

The rear group includes a rear variable power lens unit having one or more lens units moving at the time of zooming and a lens unit having a positive refractive power and configured not to move at the time of zooming in this order from the magnification conjugate side to the reduction conjugate side. The aperture stop moves at the time of zooming. The front group includes an auxiliary stop having a constant aperture diameter moving at the time of zooming.

Figure 3A:
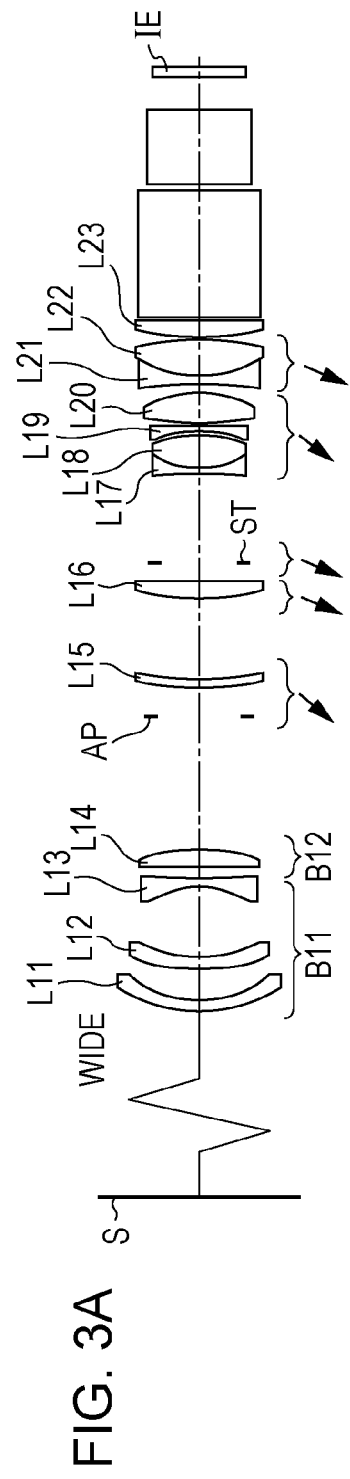
FIGS. 3A and 3B illustrate cross-sectional views of a lens at a wide angle end and a telephoto end, respectively, in accordance with Example 2.
Figure 3B:
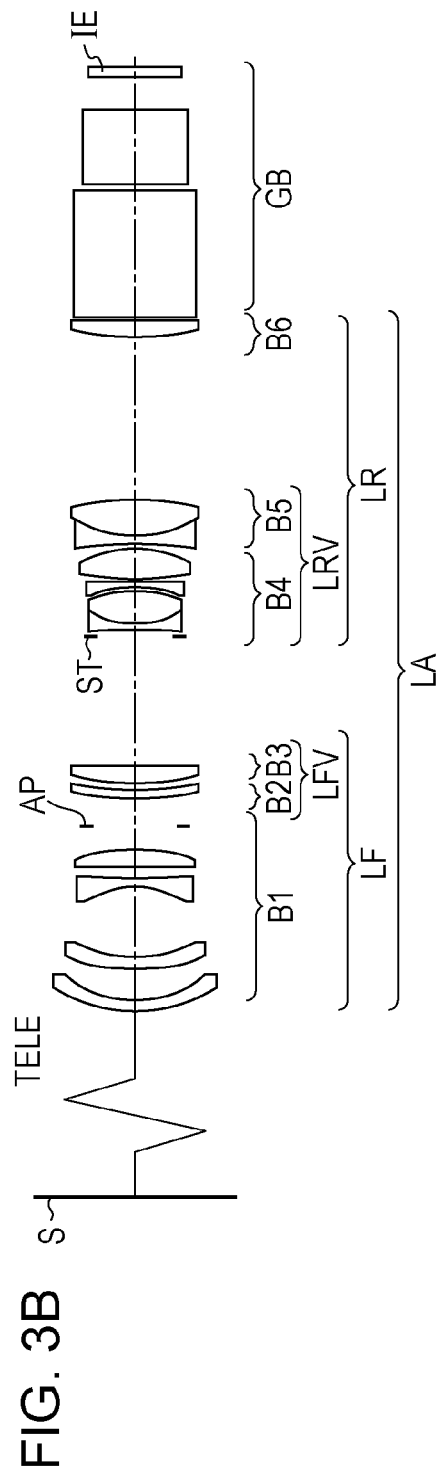

FIGS. 1A and 1B are cross-sectional views of lenses of the zoom lens of Example 1 of this disclosure at the wide angle end (short focus length end) and the telephoto end (long focus length end). FIGS. 2A and 2B are vertical aberrations drawings of the zoom lens of Example 1 of this disclosure at the wide angle end and the telephoto end respectively at a projection distance of 2100 mm. FIGS. 3A and 3B are cross-sectional views of lenses of the zoom lens of Example 2 of this disclosure at the wide angle end and the telephoto end. FIGS. 4A and 4B are vertical aberrations drawings of the zoom lens of Example 2 of this disclosure at the wide angle end and the telephoto end respectively at a projection distance of 2100 mm.

Figure 7:
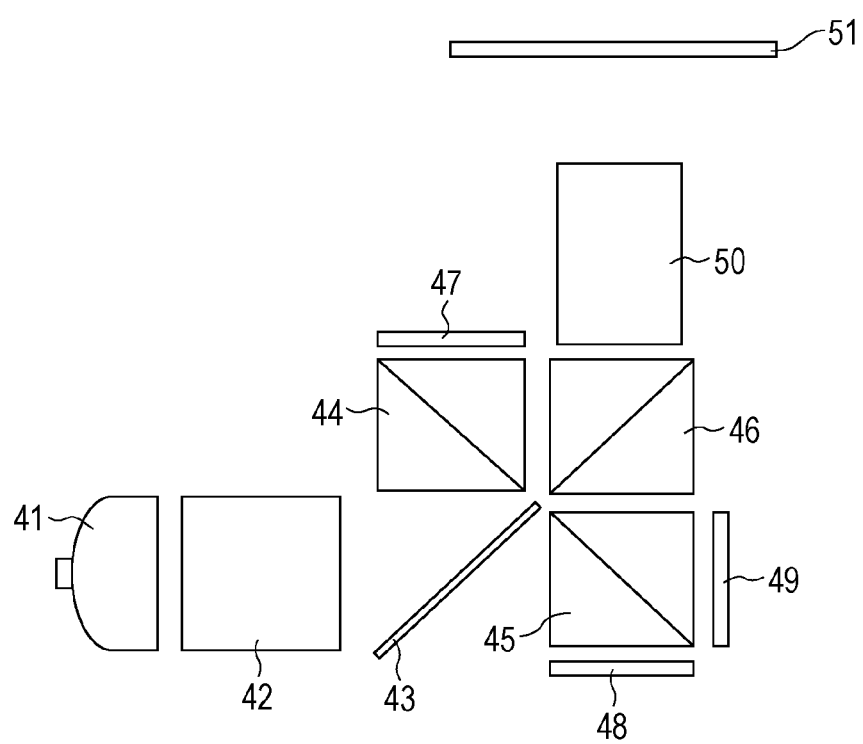
FIG. 7 is a schematic drawing illustrating relevant portions of an image projection apparatus in accordance with an embodiment of the present invention.

FIGS. 5A and 5B are cross-sectional views of lenses of the zoom lens of Example 3 of this disclosure at the wide angle end and the telephoto end. FIGS. 6A and 6B are vertical aberrations drawings of the zoom lens of Example 3 of this disclosure at the wide angle end and the telephoto end respectively at a projection distance of 2100 mm. FIG. 7 is a schematic view of a principal portion of an image projecting apparatus having the zoom lens of this disclosure.

The zoom lenses of the respective examples are projection lenses (projection optical systems) used in the image projecting apparatuses (projectors). In the cross-sectional view of the lenses, the left side corresponding to the magnification conjugate side (screen) (front side), and the right side corresponds to the reduction conjugate side (image display device side) (rear side). Reference sign LA denotes a zoom lens.

Reference sign LF denotes the front group, and sign LR denotes the rear group. Reference sign Bi denotes an $i^{th}$ lens unit. Reference sign ST denotes an aperture stop. Reference sign AP denotes an auxiliary stop. Reference sign IE corresponds to an original image (projected image) such as a liquid crystal panel (image display device) and the like. Reference sign S denotes a screen surface. Reference sign GB denotes an optical block corresponding to a color resolution and synthesis prism, an optical filter, a face plate (parallel flat glass), a crystal low-pass filter, and an infrared cut filter. Arrows indicate directions of movement (loca of movement) of the lens units at the time of zooming from the wide angle end to the telephoto end. The wide angle end and the telephoto end described below correspond to zoom positions at which the variable power lens unit is located at the two ends of a moving range on the optical axis of the mechanism.

In aberration charts, Fno denotes an F number, and ω denotes a half angle of view (degrees). In the spherical aberration chart (LONGITUDINAL, SPHERICAL, ABER), three curves for a wavelength of 470 nm, a wavelength of 550 nm, and a wavelength of 620 nm are shown. In an aspherical aberration chart (ASTIGMATIC, FIELD, CURVES), a dotted line indicates a meridional image surface, and a solid line indicates a sagittal image surface. A distortion aberration chart (DISTORTION) shows a curve for a wavelength of 550 nm.

The zoom lens of the respective examples includes a front group LF on the magnification conjugate side and a rear group LR on the reduction conjugate side with an aperture stop ST as a boundary. The front group LF includes a first lens unit B1 having a negative refractive power and configured to move at the time of focusing, an auxiliary stop AP, a second lens unit B2 having a positive refractive power, and a third lens unit B3 having a positive refractive power in this order from the magnification conjugate side to the reduction conjugate side.

The rear group LR includes a forth lens unit B4 having a negative refractive power, a fifth lens unit B5 having a positive refractive power, and a sixth lens unit B6 having a positive refractive power. The first lens unit B1 and the sixth lens unit B6 do not move when zooming is performed. The second lens unit B2 to the fifth lens unit B5 move toward the magnification conjugate side at the time of zooming from the wide angle end to the telephoto end.

The first lens unit B1 and the sixth lens unit B6 are lens units which do not contribute to power fluctuation, and the second lens unit B2 and the fifth lens unit B5 are variable power lens units. Here, the second lens unit B2 and the third lens unit B3 constitute a front variable power lens unit LFV. The fourth lens unit B4 and the fifth lens unit B5 constitute a rear variable power lens unit LRV.

The first lens unit B1 includes an eleventh lens unit B11 having a negative refractive power and a twelfth lens unit B12 having a positive refractive power, and moves along a locus (at different speeds) at the time of focusing.

The respective examples are the zoom lenses used in the image projecting apparatuses having a light valve (especially 3 CCD projectors having a liquid crystal device mounted thereon). The zoom lenses in the respective examples may be used as an image pickup optical system for image pickup apparatuses using an image pickup device instead of the light valve.

Each of the zoom lenses of the examples is composed of six lens units; the first lens unit B1 to the sixth lens unit B6 having negative, positive, positive, negative, positive, and positive refractive powers in this order from the magnification conjugate side to the reduction conjugate side. At the time of zooming, the second lens unit B2 to the fifth lens unit B5 move. Between the third lens unit B3 and the fourth lens unit B4, an aperture stop STR moving at the time of zooming is provided. The lengths from a focal point position of the front group LF to an aperture stop FT at the wide angle end and the telephoto end are expressed as Xw and Xt, respectively. The imaging magnifications of the rear group LR at the wide angle end and the telephoto end are expressed as βwb and βtb, respectively.

At this time, the condition $$0.9 < (Xt \cdot \beta tb)/(Xw \cdot \beta wb) < 1.1 \qquad (1)$$

is satisfied.

The examples are each configured in such a manner that a distance from the focal point position of the front group LF to the aperture stop ST of the lens units on the magnification conjugate side with respect to the aperture stop ST and a synthetic imaging magnification of the rear group LR by the lens units on the reduction conjugate side with respect to the aperture stop ST satisfy the conditional expression (1). In this configuration, a zoom lens with a smaller change in F number at the time of zooming over the entire zoom range is realized. If the upper limit value or the lower limit value of the conditional expression (1) is exceeded, reduction of the change in F number at the time of zooming becomes difficult. A zoom lens with a smaller change in F number at the time of zooming over the entire zoom range is obtained by satisfying the conditional expression (1).

In the zoom lens of this disclosure, the following configuration is recommended for alleviating generation of excessive light which leads to the occurrence of a flare at the wide angle end and intermediate zoom positions. In the normal zoom lens, the occurrence of a flare is suppressed by removing excessive light at a lens end of a variable power portion or a mechanical portion holding the lens end on the side of the magnification conjugate side with respect to the aperture stop at the wide lens end. However, when the axial optical flux at the variable power portion on the magnification conjugate side with respect to the aperture stop becomes denser at the telephoto end, removal of the flare light at the wide angle end becomes difficult. Assuming that the excessive light is removed by limiting the lens diameter of the variable power portion at the width angle end, the F number at the telephoto end becomes large (dark).

Accordingly, in this disclosure, an auxiliary stop AP positioned on the magnification conjugate side with respect to the aperture stop ST, moving at the time of zooming and having a constant auxiliary stop AP is arranged. In this configuration, despite having a small change in the F number at the time of zooming over the entire zoom range, a zoom lens configured to correct the change of the various aberrations at the time of zooming and having a desirable optical performance over the entire screen is obtained. The aperture diameter of the auxiliary stop AP may be changed at the time of zooming.

In the examples, the auxiliary stop AP may be configured to move integrally with the second lens unit B2 (along the same locus), or to move along a locus different from other lens units at the time of zooming. The auxiliary stop AP positioned on the magnification conjugate side with respect to the aperture stop ST and moving at the time of zooming is arranged on the magnification conjugate side with respect to a magnification conjugate side lens top of the lens on the most magnification conjugate side of the variable power lens unit (the second lens unit) (hereinafter, referred to as "the lens top of the lens on the most magnification conjugate side of the variable power lens unit"). In other words, the auxiliary stop AP is arranged on the magnification conjugate side with respect to the front variable power lens unit LFV in the examples.

The length from the lens surface of the lens on the most magnification conjugate side of the front variable power lens unit LFV to the auxiliary stop AP in the entire zoom range is expressed as Ls2. The length from the lens surface of the lens on the most magnification conjugate side to the lens surface of the lens on the most reduction conjugate side is expressed as L. At this time, the conditional expression $$0.02 < Ls2/L \quad (2)$$

is satisfied.

Here, the length Ls2 of the conditional expression (2) is a length that is appropriate for all of the zoom positions in the entire zoom range.

The conditional expression (2) means that at least predetermined distance is provided from the lens top of the lens on the most magnification conjugate side to the auxiliary stop. When the conditional expression (2) is not satisfied, if the diameter of the optical flux is reduced to reduce the excessive light, the axial optical flux is also reduced at the telephoto end, so that the F number becomes dark (large). By satisfying the conditional expression (2), effective removal of the excessive light at the wide angle end and an intermediate zoom position is easily achieved without reducing the axial optical flux at the telephoto end (despite having a little change in the F number at the time of zooming).

The distance in the conditional expression (2) affects the angle of view. The angle of view of the excessive light to be removed becomes smaller with reduction of angle of view at the wide angle end, and hence the distance in the conditional expression (2) needs to be large in order to effectively remove the excessive light.

The projection angle of view at the wide angle end when the zoom lenses of the examples are used in the image projection apparatus configured to project an original image created by the image display device is expressed as 2ω. At this time, it is preferable that the conditional expression, $$0.02 < Ls2/(L \cdot \cos \omega) < 0.06 \quad (3)$$

is satisfied.

The conditional expression (3) is for removing the excessive light effectively for a given angle of view. A configuration with a smaller change in the F number at the time of zooming over the entire zoom range is obtained by satisfying the conditional expression (3). In addition, the zoom lens configured to correct the change of the various aberrations at the time of zooming and having a desirable optical performance over the entire screen is easily obtained. The range of the values of the conditional expressions (1) to (3) is preferably set as follows.

$$0.95 < (Xt \cdot \beta tb)/(Xw \cdot \beta wb) < 1.05 \quad (1a)$$

$$0.025 < Ls2/L < 0.050 \quad (2a)$$

$$0.03 < Ls2/(L \cdot \cos \omega) < 0.05 \quad (3a)$$

As described above, according to the examples, since the F number is constant in the entire zoom range, fluctuation in brightness depending on the zoom position is small and the fluctuation in aberration in association with the zooming is also small, so that the zoom lens having high optical performance is obtained.

Subsequently, lens configurations of the zoom lenses of the respective examples will be described. A zoom lens (projection lens unit) 1 of Example 1 has the first lens unit B1 having a negative refractive power, the second lens unit B2 having a positive refractive power, and the third lens unit B3 having a positive refractive power in this order from the magnification conjugate side to the reduction conjugate side. The zoom lens 1 further is a six group zoom lens including a forth lens unit B4 having a negative refractive power, and a fifth lens unit B5 having a positive refractive power and a sixth lens unit B6 having a positive refractive power. The first lens unit and the sixth lens unit are configured not to move at the time of zooming. At the time of zooming, the second lens unit and the fifth lens unit move.

The first lens unit B1 includes negative, negative, negative, and positive lenses L11 to L14 in this order from the magnification conjugate side to the reduction conjugate side, the second lens unit B2 includes one positive lens L15, and the third lens unit B3 includes one positive lens L16. Furthermore, the fourth lens unit B4 includes negative, positive, negative, and positive lenses L17 to L20 in this order from the magnification conjugate side to the reduction conjugate side, and the fifth lens unit B5 includes negative and positive lenses L21 and L22. The sixth lens unit B6 includes on positive lens L23.

The second lens unit B2 to the fifth lens unit B5 both move toward the magnification conjugate side at the time of zooming from the wide angle side (wide) to the telephoto side (tele). At the time of focusing, an eleventh lens unit B11 including three lenses and having a negative refractive power on the magnification conjugate side of the first lens unit B1 and a twelfth lens unit B12 including one lens on the reduction conjugate side move along different loca.

The aperture stop ST moving at the time of zooming is provided between the third lens unit B3 and the fourth lens unit B4, and the auxiliary stop AP configured to move at the time of zooming is provided on the magnification conjugate side with respect to the aperture stop ST. The auxiliary stop AP moves along the same locus as the second lens unit B2 at the time of zooming. The auxiliary stop AP may be configured of part of a lens barrel. Alternatively, the auxiliary stop AP may be formed of a ring-shaped metallic plate.

In the examples, with the configuration satisfying the conditional expression (1), a configuration having a little change in F number Fno at the time of changing the power. Also, the excessive light at the wide angle end is effectively removed by satisfying the conditional expressions (2) and (3), so that a high-quality projecting image with less flare is realized with a configuration in which the change in the F number at the time of changing the power.

Example 2 is different from Example 1 only in the angle of view (ω) at the wide angle end, and has the same zoom type such as a lens configuration and conditions of movement of the respective lens units at the time of zooming as Example 1. The lens configurations of the respective lens units are also the same as Example 1. The aperture stop ST, the arrangement of the auxiliary stop AP, and the conditions of the movement at the time of zooming are the same as Example 1. In the configuration of example 2, since the angle of view at the wide angle end is smaller than that in Example 1, the auxiliary stop AP is set to a position farther from the lens top on the most magnification conjugate side.

In Example 2, the distance between the aperture stop ST to the lens top with respect to the entire length of the optical system is 0.039, which is larger than 0.030 of Example 1 and means that the distance is larger than that of Example 1.

Example 3 has the same zoom type such as a lens configuration and conditions of movement of the respective lens units at the time of zooming as Example 1. The lens configurations of the respective lens units are also the same as Example 1. The configuration of Example 3 different from that of Example 1 is that the auxiliary stop AP moves along the locus different from other lens units at the time of zooming. In this configuration, fluctuations of various aberrations at the time of zooming such as the axial chromatic aberration are easily suppressed. Example 3 also satisfies the conditional expressions (1) to (3).

An image projection apparatus illustrated in FIG. 7 will be described. In FIG. 7, reference numeral 41 denotes a light source. Reference numeral 42 denotes an illumination optical system which realizes illumination with less unevenness with respect to the image display device, and has a function to align the direction of polarization of outgoing light with an arbitrary direction between P-polarization and the S-polarization. Reference numeral 43 is a color-separator optical system configured to resolve light from the illumination optical system 42 into given colors supported by the image display device.

Reference numerals 47, 48, and 49 denote image display devices composed of reflective liquid crystal configured to modulate the incoming polarized light according to an electric signal. Reference numerals 44 and 45 are polarizing beam splitters configured to allow light to transmit or reflect in the image display devices 47, 48, and 49 in response to the modulation. Reference numeral 46 denotes a color synthesis optical system configured to synthesize light from the image display devices 47, 48, and 49 into one. Reference numeral 50 denotes a projection optical system configured to project the light synthesized by the color synthesis optical system 46 onto a projected member such as a screen 51.

The projection optical system 50 employs the zoom lens of this disclosure. In this configuration, despite having a little change in the F number at the time of zooming over the entire zoom range, an image projecting apparatus configured to correct the change of the various aberrations at the time of zooming and having a desirable optical performance over the entire screen is obtained.

Although the preferred embodiments of this disclosure have been described thus far, the invention is not limited to these embodiments, and various changes and modifications may be made within the scope of the invention.

Subsequently, numerical examples of the zoom lenses of the respective embodiments will be shown below. Surface numbers of the lens configurations in Numerical Example 1 (Table A) are numbers assigned to the respective lens surfaces in the order from the magnification conjugate side to the reduction conjugate side. Reference sign r denotes a radius of curvature of the lens surface, reference sign d denotes a distance (physical distance) on the optical axis between the lens surface i and the lens surface (i+1).

The distances marked as "variable" in the tables change with zooming. Reference signs nd and vd indicates refractive power and Abbe number with respect to a d line of materials which constitutes the respective lenses. Tables A show focal distance, aperture ratio (F number), half angle of view, entire length of lens, air converted back focus (BF), zoom ratio of zoom lenses of the numerical examples, and distances between respective lens units at the time of zooming. Tables B show coefficients of aspherical surface A to G indicating the aspherical shape. Reference sign "y" denotes a coordinate in the radial direction of the lens surface, and reference sign "x" denotes a coordinate in the direction of the optical axis. E-X indicates $10^{-x}$.

$$x=(y^2/R)/[1+\{1-(1+K)(y^2/R^2)\}^{1/2}]+Ay^4+By^6+Cy^8+Dy^{10}+Ey^{12}+Fy^{14}+Gy^{16}$$

Relationships between the respective examples and the numerical values described above are shown in Tables C.

TABLE A

LENS CONFIGURATION

|  | Wide Angle | Intermediate | Telephoto |
|---|---|---|---|
| f(focal distance) | 21.78 | 30.71 | 39.20 |
| F(aperture Ratio) | 2.8 | 2.8 | 2.8 |
| Half Angle Of View | 31.0 | 23.1 | 18.5 |
| Entire Length Of Lens | 166.9 | | |
| BF | 58.2 | | |

Zoom Ratio 1.80

| | | | |
|---|---|---|---|
| r1 = 35.62 | d1 = 2.50 | n1 = 1.805 | v1 = 25.4 |
| r2 = 25.53 | d2 = 7.59 | | |
| r3 = 75.80 | d3 = 3.00 | n2 = 1.531 | v2 = 55.9 |
| r4 = 31.32 | d4 = 16.30 | | |
| r5 = −30.46 | d5 = 2.00 | n3 = 1.487 | v3 = 70.2 |
| r6 = 67.66 | d6 = 5.01 | | |
| r7 = 264.92 | d7 = 4.55 | n4 = 1.806 | v4 = 33.3 |
| r8 = −56.77 | d8 = variable | | |
| r9 = ∞ | d9 = 5.03 | | (auxiliary aperture) |
| r10 = 47.30 | d10 = 2.35 | n5 = 1.487 | v5 = 70.2 |
| r11 = 55.12 | d11 = variable | | |
| r12 = 50.39 | d12 = 4.20 | n6 = 1.834 | v6 = 37.2 |
| r13 = −5389.26 | d13 = variable | | |
| r14 = ∞ | d14 = variable | | (aperture stop) |
| r15 = −150.01 | d15 = 1.30 | n7 = 1.806 | v7 = 33.3 |
| r16 = 18.79 | d16 = 8.40 | n8 = 1.618 | v8 = 63.3 |
| r17 = −30.81 | d17 = 1.21 | | |
| r18 = −20.49 | d18 = 1.30 | n9 = 1.805 | v9 = 25.4 |
| r19 = −570.14 | d19 = 0.52 | | |
| r20 = 120.54 | d20 = 7.60 | n10 = 1.497 | v10 = 81.5 |
| r21 = −23.89 | d21 = variable | | |
| r22 = −95.95 | d22 = 1.85 | n11 = 1.800 | v11 = 29.8 |
| r23 = 30.03 | d23 = 9.25 | n12 = 1.805 | v12 = 25.4 |
| r24 = −67.24 | d24 = variable | | |
| r25 = 62.41 | d25 = 3.70 | n13 = 1.805 | v13 = 25.4 |
| r26 = 281.63 | d26 = 2.3 | | |
| r27 = ∞ | d27 = 30.0 | n14 = 1.516 | v14 = 64.1 |
| r28 = ∞ | d28 = 1.9 | | |
| r29 = ∞ | d29 = 17.7 | n15 = 1.805 | v15 = 25.4 |
| r30 = ∞ | d30 = 5.0 | | |
| r31 = ∞ | d31 = 2.3 | n16 = 1.516 | v16 = 64.1 |

| At the time of zooming (Projecting Distance 2100 mm) | | | | At the time of focusing (wide angle end) | | |
|---|---|---|---|---|---|---|
| Group | | | | | | |
| Distance | Wide Angle | Intermediate | Telephoto Group | Distance | 1200 mm | 9000 mm |
| d8 | 35.45 | 4.55 | 3.89 | d6 | 5.25 | 4.70 |
| d11 | 15.57 | 22.30 | 4.13 | d11 | 34.81 | 36.44 |
| d13 | 6.28 | 21.82 | 32.38 | d17 | 15.57 | 15.57 |
| d14 | 19.39 | 9.65 | 1.50 | d22 | 6.28 | 6.28 |
| d21 | 1.57 | 10.04 | 7.51 | d23 | 19.39 | 19.39 |
| d24 | 1.00 | 10.89 | 29.85 | d24 | 1.57 | 1.57 |
| | | | | d25 | 1.00 | 1.00 |

TABLE B

Coefficient of Aspherical Surface r3   K = 0 A = 1.73E−05 B = −3.17E−08 C = 2.98E−11 D = 1.09E−13
     E = −1.13E−16 F = −3.59E−19 G = 6.86E−22
r4   K = 0 A = 1.22E−05 B = −3.39E−08 C = −1.53E−11 D = 1.03E−13
     E = 1.31E−15 F = −5.79E−18 G = 7.26E−21

TABLE C

Values of Conditional Expressions

| | |
|---|---|
| Conditional Expression (1) | 1.02 |
| Conditional Expression (2) | 0.030 |
| Conditional Expression (3) | 0.035 |

Numerical Examples 2

TABLE A

Lens Configuration

| | Wide Angle | Intermediate | Telephoto |
|---|---|---|---|
| f (Focal Distance) | 21.78 | 30.49 | 39.20 |
| F (Aperture Ratio) | 2.8 | 2.8 | 2.8 |
| Half Angle of View (degree) | 24.6 | 18.1 | 14.3 |

| | | |
|---|---|---|
| Entire Length Of Lens | | 167.0 |
| BF | | 58.2 |
| Zoom Ratio | | 1.80 |

| | | | |
|---|---|---|---|
| r1 = 38.08 | d1 = 2.50 | n1 = 1.805 | ν1 = 25.4 |
| r2 = 25.60 | d2 = 7.59 | | |
| r3 = 74.15 | d3 = 3.00 | n2 = 1.531 | ν2 = 55.9 |
| r4 = 34.97 | d4 = 16.30 | | |
| r5 = −23.79 | d5 = 2.00 | n3 = 1.487 | ν3 = 70.2 |
| r6 = 65.43 | d6 = 2.95 | | |
| r7 = 204.10 | d7 = 4.55 | n4 = 1.806 | ν4 = 33.3 |
| r8 = −46.29 | d8 = variable | | |
| r9 = ∞ | d9 = 6.88 | | (Auxiliary Stop) |
| r10 = 54.36 | d10 = 2.35 | n5 = 1.487 | ν5 = 70.2 |
| r11 = 69.76 | d11 = variable | | |
| r12 = 51.41 | d12 = 4.20 | n6 = 1.834 | ν6 = 37.2 |
| r13 = −9653.49 | d13 = variable | | |
| r14 = ∞ | d14 = variable | | (Aperture Stop) |
| r15 = −393.80 | d15 = 1.30 | n7 = 1.806 | ν7 = 33.3 |
| r16 = 16.85 | d16 = 8.40 | n8 = 1.618 | ν8 = 63.3 |
| r17 = −35.64 | d17 = 1.21 | | |
| r18 = −21.34 | d18 = 1.30 | n9 = 1.805 | ν9 = 25.4 |
| r19 = 248.42 | d19 = 0.52 | | |
| r20 = 76.12 | d20 = 7.60 | n10 = 1.497 | ν10 = 81.5 |
| r21 = −23.56 | d21 = variable | | |
| r22 = −64.17 | d22 = 1.85 | n11 = 1.800 | ν11 = 29.8 |
| r23 = 30.33 | d23 = 9.25 | n12 = 1.805 | ν12 = 25.4 |
| r24 = −51.25 | d24 = variable | | |
| r25 = 63.75 | d25 = 3.70 | n13 = 1.805 | ν13 = 25.4 |
| r26 = 425.77 | d26 = 1.0 | | |
| r27 = ∞ | d27 = 30.0 | n14 = 1.516 | ν14 = 64.1 |
| r28 = ∞ | d28 = 1.9 | | |
| r29 = ∞ | d29 = 17.7 | n15 = 1.805 | ν15 = 25.4 |
| r30 = ∞ | d30 = 8.0 | | |
| r31 = ∞ | d31 = 2.3 | n16 = 1.516 | ν16 = 64.1 |

At the time of zooming (Projecting Distance 2100 mm)

| Group Distance | Wide Angle | Intermediate | Telephoto |
|---|---|---|---|
| d8 | 32.08 | 4.84 | 5.10 |
| d11 | 19.21 | 22.10 | 1.98 |
| d13 | 4.56 | 19.85 | 31.57 |
| d14 | 21.00 | 11.00 | 1.13 |
| d21 | 2.20 | 4.78 | 0.50 |
| d24 | 0.50 | 16.98 | 39.26 |

TABLE B

Coefficient of Aspherical Surface r3   K = 0 A = 1.63E−05 B = −2.37E−08 C = −1.09E−11 D = 3.03E−13
     E = −4.29E−16 F = 7.78E−19 G = −2.44E−21
r4   K = 0 A = 8.72E−06 B = −3.34E−08 C = −3.07E−11 D = 1.39E−13
     E = 1.82E−15 F = −6.40E−18 G = 2.25E−21

TABLE C

Values of Conditional Expressions

| | |
|---|---|
| Conditional Expression (1) | 1.00 |
| Conditional Expression (2) | 0.039 |
| Conditional Expression (3) | 0.043 |

Numerical Examples 3

TABLE A

Lens Configuration

| | Wide Angle | Intermediate | Telephoto |
|---|---|---|---|
| f (Focal Distance) | 21.78 | 30.71 | 39.21 |
| F (Aperture Ratio) | 2.8 | 2.8 | 2.8 |
| Half Angle of View (degree) | 31.0 | 23.1 | 18.5 |

| | | |
|---|---|---|
| Entire Length of Lens | | 167.0 |
| BF | | 58.2 |
| Zoom Ratio | | 1.80 |

| | | | |
|---|---|---|---|
| r1 = 36.17 | d1 = 2.50 | n1 = 1.805 | ν1 = 25.4 |
| r2 = 25.59 | d2 = 7.59 | | |
| r3 = 72.15 | d3 = 3.00 | n2 = 1.531 | ν2 = 55.9 |
| r4 = 29.85 | d4 = 16.30 | | |
| r5 = −32.14 | d5 = 2.00 | n3 = 1.487 | ν3 = 70.2 |
| r6 = 72.66 | d6 = 5.44 | | |
| r7 = 253.03 | d7 = 4.55 | n4 = 1.806 | ν4 = 33.3 |
| r8 = −58.88 | d8 = variable | | |
| r9 = ∞ | d9 = variable | | (Auxiliary Stop) |
| r10 = 47.12 | d10 = 2.35 | n5 = 1.487 | ν5 = 70.2 |
| r11 = 55.08 | d11 = variable | | |
| r12 = 50.98 | d12 = 4.20 | n6 = 1.834 | ν6 = 37.2 |
| r13 = 14440.21 | d13 = variable | | |
| r14 = ∞ | d14 = variable | | (Aperture Stop) |
| r15 = −127.36 | d15 = 1.30 | n7 = 1.806 | ν7 = 33.3 |
| r16 = 19.04 | d16 = 8.40 | n8 = 1.618 | ν8 = 63.3 |
| r17 = −30.02 | d17 = 1.21 | | |
| r18 = −20.33 | d18 = 1.30 | n9 = 1.805 | ν9 = 25.4 |
| r19 = −435.06 | d19 = 0.52 | | |
| r20 = 126.77 | d20 = 7.60 | n10 = 1.497 | ν10 = 81.5 |
| r21 = −23.73 | d21 = variable | | |
| r22 = −102.46 | d22 = 1.85 | n11 = 1.800 | ν11 = 29.8 |
| r23 = 30.20 | d23 = 9.25 | n12 = 1.805 | ν12 = 25.4 |
| r24 = −68.82 | d24 = variable | | |
| r25 = 62.22 | d25 = 3.70 | n13 = 1.805 | ν13 = 25.4 |
| r26 = 265.15 | d26 = 1.0 | | |
| r27 = ∞ | d27 = 30.0 | n14 = 1.516 | ν14 = 64.1 |
| r28 = ∞ | d28 = 1.9 | | |
| r29 = ∞ | d29 = 17.7 | n15 = 1.805 | ν15 = 25.4 |
| r30 = ∞ | d30 = 7.0 | | |
| r31 = ∞ | d31 = 2.3 | n16 = 1.516 | ν16 = 64.1 |

At the time of zooming (Projecting Distance 2100 mm)

| Group Distance | Wide Angle | Intermediate | Telephoto |
|---|---|---|---|
| d6 | 5.44 | 5.44 | 5.44 |
| d8 | 32.73 | 3.32 | 4.24 |
| d9 | 7.02 | 3.62 | 1.00 |
| d11 | 16.27 | 24.42 | 6.82 |
| d13 | 7.62 | 22.64 | 34.05 |
| d14 | 18.57 | 9.67 | 0.88 |

TABLE A-continued

Lens Configuration

| | | | |
|---|---|---|---|
| d21 | 1.23 | 10.05 | 8.65 |
| d24 | 0.50 | 10.21 | 28.29 |

TABLE B

Coefficient of Aspherical Surface

| | |
|---|---|
| r3 | K = 0 A = 1.54E−05 B = −2.24E−08 C = −1.62E−11 D = 2.62E−13 E = −5.47E−16 F = 5.13E−19 G = −1.95E−22 |
| r4 | K = 0 A = 1.03E−05 B = −2.46E−08 C = −3.94E−11 D = 3.85E−14 E = 1.62E−15 F = −5.48E−18 G = 5.23E−21 |

TABLE C

Values of Conditional Expressions

| | |
|---|---|
| Conditional Expression (1) | 1.04 |
| Conditional Expression (2) | 0.041 |
| Conditional Expression (3) | 0.035 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-255274 filed Nov. 21, 2012, which is hereby incorporated by reference herein in its entirety.

What is claimed is:

1. A zoom lens comprising:
a front group having a plurality of lens units;
an aperture stop; and
a rear group having a plurality of lens units in this order from a magnification conjugate side to a reduction conjugate side, wherein
the front group includes a lens unit having a negative refractive power and configured not to move for zooming, and a front variable power lens unit including one or more lens units moving during zooming in the order from the magnification conjugate side to the reduction conjugate side,
the rear group includes a rear variable power lens unit having one or more lens units moving during zooming and a lens unit having a positive refractive power and configured not to move for zooming in this order from the magnification conjugate side to the reduction conjugate side,
the aperture stop moves along a locus different from all other lens units of the zoom lens during zooming,
the front group includes an auxiliary stop having a constant aperture diameter moving during zooming, and
a conditional expression, $0.9 < (X_t \cdot \beta_{tb})/(X_w \cdot \beta_{wb}) < 1.1$ is satisfied, where $X_w$ and $X_t$ are the length from a focal point position of the front group to the aperture stop at the wide angle end and the telephoto end and $\beta_{wb}$ and $\beta_{tb}$ are the imaging magnifications of the rear group at the wide angle end and the telephoto end, respectively.

2. The zoom lens according to claim 1, wherein
the front group includes:
a first lens unit having a negative refractive power and configured not to move for zooming and configured to move during focusing,
a second lens unit having a positive refractive power and configured to move during zooming, and
a third lens unit having a positive refractive power in the order from a magnification conjugate side to a reduction conjugate side, and
the rear group includes:
a fourth lens unit having a negative refractive power and configured to move during zooming,
a fifth lens unit having a positive refractive power; and
a sixth lens unit having a positive refractive power and configured not to move for zooming in the order from a magnification conjugate side to a reduction conjugate side.

3. The zoom lens according to claim 1, wherein
the auxiliary stop is arranged on the magnification conjugate side with respect to the front variable power lens unit, and a conditional expression $0.02 < L_{s2}/L$ is satisfied in the entire zoom range where $L_{s2}$ is the length from a lens surface of the lens on the most magnification conjugate side of the front variable power lens unit LFV to the auxiliary stop, and L is the length from a lens surface of the lens on the most magnification conjugate side to the lens surface of the lens on the most reduction conjugate side.

4. The zoom lens according to claim 1, wherein, during zooming, the auxiliary stop moves along a locus different from all other lens units of the zoom lens.

5. An image projection apparatus comprising:
an image display device configured to form an original image, and
the zoom lens according to claim 1 configured to project the original image formed by the image display device.

6. The image projection apparatus according to claim 5, wherein
the auxiliary stop is arranged on the magnification conjugate side with respect to the front variable power lens unit, and
a conditional expression $0.02 < L_{s2}/(L \sim \cos \omega) < 0.06$ is satisfied over an entire zoom range where $L_{s2}$ is a length from the lens surface of the lens on the most magnification conjugate side of the front variable power lens unit to the auxiliary stop, L is a length from the lens surface of the lens on the most magnification conjugate side to the lens surface of the lens on the most reduction conjugate side, and $2\omega$ is a projection angle of view at the wide angle end.

* * * * *